United States Patent
Kadota et al.

[11] Patent Number: 5,818,550
[45] Date of Patent: Oct. 6, 1998

[54] COLOR DISPLAY DEVICE

[75] Inventors: Hisashi Kadota; Yuko Inoue; Takenobu Urazono; Masafumi Kunii, all of Kanagawa; Shinji Nakamura, Tokyo, all of Japan

[73] Assignee: Sony Corporation, Tokyo, Japan

[21] Appl. No.: 544,568

[22] Filed: Oct. 18, 1995

[30] Foreign Application Priority Data

Oct. 19, 1994 [JP] Japan .................................... 6-280096

[51] Int. Cl.⁶ .......................... G02F 1/136; G02F 1/1333
[52] U.S. Cl. .................. 349/43; 349/44; 349/106; 349/122
[58] Field of Search .................... 359/59, 67, 68, 359/62, 74, 79; 345/92, 88; 349/42, 43, 44, 46, 47, 106, 110, 122, 138; 257/59, 72

[56] References Cited

U.S. PATENT DOCUMENTS

| 5,208,690 | 5/1993 | Hayashi et al. | 349/143 |
| 5,327,001 | 7/1994 | Wakai et al. | 359/59 |
| 5,446,562 | 8/1995 | Sato | 359/59 |
| 5,539,551 | 7/1996 | Nomoto et al. | 349/139 |
| 5,585,951 | 12/1996 | Noda et al. | 349/122 |

FOREIGN PATENT DOCUMENTS

| 0 366 116 A2 | 5/1990 | European Pat. Off. . | |
| 0387805 | 9/1990 | European Pat. Off. | 359/62 |
| 0 603 866 A1 | 6/1994 | European Pat. Off. . | |
| 4-184423 | 7/1992 | Japan | 359/68 |

OTHER PUBLICATIONS

Patent Abstracts of Japan, vol. 017, No. 033 (P–1473), Jan. 21, 1993 & JP–A–04 253028 (Sharp Corp.), Sep. 8, 1992.
Patent Abstracts of Japan, vol. 013, No.424 (P–934), Sep. 21, 1989 & JP–A–01 156725 (Seiko Epson Corp.), Jun. 20, 1989.
Patent Abstracts of Japan, vol. 018, No. 402, (P–1777), Jul. 27, 1994 & JP–A–06 118400 (Oki Electric Ind. Co. Ltd.), Apr. 28, 1994.

*Primary Examiner*—William L. Sikes
*Assistant Examiner*—Tai V. Duong
*Attorney, Agent, or Firm*—Hill & Simpson

[57] ABSTRACT

A color display device such as an active-matrix type liquid crystal display apparatus has a first substrate having pixel electrodes arranged in the form of the matrix, switching elements associated with respective pixel electrodes and color filters aligned with the respective pixel electrodes. The first substrate is composed of a laminate structure including, superposed in the mentioned sequence, a first layer having the switching elements, a second layer having the color filters, a third layer including a planarization film which fills convexities presented by the switching elements and the color filters, and a fourth layer having the pixel electrodes aligned with the color filter. The display device also has a second substrate including a counter electrode and adjoined to the first substrate leaving a predetermined gap left therebetween. A liquid crystal is charged in the gap between the first and second substrates.

25 Claims, 5 Drawing Sheets

COLOR DISPLAY DEVICE

BACKGROUND OF THE INVENTION

1. Field of the Invention:

The present invention relates to a color display device and, more particularly, to a color display device of active matrix type having a color filter provided on a substrate which carries switching elements formed thereon to drive pixel electrodes.

2. Description of Related Art:

Development is being made in recent years of color liquid crystal display devices of the type in which thin-film transistors (TFTs) are used as switching elements for driving pixel electrodes. FIG. 5 shows an example of previously proposed color liquid crystal display device. This device has a glass substrate 0 and TFTs integrated on the glass substrate 0 so as to drive pixel electrodes 1. Each TFT has a device area presented by a semiconductor thin film 2 on which patterned and formed is a gate electrode 3 through the intermediary of a gate insulating film. The semiconductor thin film 2 has a source region S and a drain region D. The TFT having the described construction is covered by a first inter-layer insulating film which is denoted by 4. A wired electrode 6 is formed in a predetermined pattern on the first inter-layer insulating film 4 and is electrically connected to the source region S through a contact hole. The wired electrode 6 constitutes part of a signal line. The wired electrode 6 is covered with a second inter-layer insulating film 5. The aforementioned pixel electrode is electrically connected to the drain region D via contact holes formed in the second and first inter-layer insulating films 5, 4. A color filter 9 is formed so as to color the pixel electrode 1 in three primary colors of R, G and B. The color filter 9 is finely divided into tiny segments each of which is interposed between each pixel electrode 1 and the second inter-layer insulating film 5. Thus, the color filter 9 has red color segments 9R, green color segments 9G and blue color segments 9B. The color filter 9 is formed directly on the glass substrate 0 so as to provide a so-called on-chip color filter structure. The glass substrate O carrying the TFTs, pixel electrodes 1 and the color filter 9 will be referred to as "TFT substrate". An opposing substrate 12 is joined to oppose the TFT substrate O across a predetermined gap. A counter electrode 11 is formed on the inner surface of the opposing substrate 12. A liquid crystal 13 is held between these substrates 0 and 12.

The above-mentioned on-chip color filter structure is disclosed, for example, in Japanese Patent Laid-Open Nos. 2-54217, 3-237432, 3-72322, 3-119829, 4-253028, 2-153325, 5-5874, and so forth. Structures of the type in which a color filter is provided on the TFT substrate offer various advantages over the structures of the type in which a color filter is provided on the opposing substrate. For instance, no parallax is caused between the color filter 9 and the pixel electrodes 1, because they are superposed one on the other. It is therefore possible to set the pixel aperture ratio to a comparatively large value. The high aperture ratio can be maintained even when the degree of fineness of pixels is enhanced, because mis-alignment between the pixel electrodes 1 and the color filter 9 is significantly reduced.

The structure shown in FIG. 5, however, suffers from the following disadvantage, due to the fact that transparent pixel electrodes 1 are held in direct contact with the color filter 9. Namely, there is a risk that the color filter 9 is damaged by sputtering which is executed for the purpose of forming transparent pixel electrodes from, for example, ITO, tending to cause the surface of the color filter 9 to be roughened. The segments 9R, 9G and 9B of the color filter 9 are isolated at a constant pitch. ITO, when sputtered on the isolation zone, tends to cause imperfect etching during patterning etching conducted to form the pixel electrodes, thus increasing the risk of generation of defects. Furthermore, the pixel electrodes 1 are undesirably stepped due to influence of convexities and concavities of the underlying color filter 9, resulting in defects such as disorder of alignment and disclination of the liquid crystal, as well as generation of reverse tilt domain. At the same time, impurities contained in the color filter 9 tend to contaminate the liquid crystal 13 and orientation film (not shown) so as to degrade the same and to incur defects such as sticking in dark or bright state.

SUMMARY OF THE INVENTION

Accordingly, it is an object of the present invention to provide an improved on-chip color filter structure which is free from the problems such as roughening of the color filter surface, imperfect etching, generation of reverse tilt domain, and so forth, thereby overcoming the above-described problems.

To this end, according to the present invention, there is provided a color display device, comprising: a first substrate having pixel electrodes arranged in the form of a matrix, switching elements associated with respective pixel electrodes and color filters aligned with the respective pixel electrodes, the first substrate having a laminate structure including a first layer having the switching elements, a second layer having the color filters, a third layer including a planarization film which fills convexities presented by the switching elements and the color filters, and a fourth layer having the pixel electrodes aligned with the color filter superposed in the order; a second substrate having a counter electrode and adjoined to the first substrate through a gap therebetween; and an electro-optical material held in the gap.

Preferably, the planarization film is formed of an organic transparent material.

The color filters may be formed of an organic photosensitive material containing pigments dispersed therein.

The second layer may include a light shielding layer which shields at least the switching elements.

The light shielding layer may comprise a metal film through which the pixel electrodes of the fourth layer are electrically connected to the switching elements of the first layer.

Alternatively, the light shielding layer may comprise an insulating film through which the pixel electrodes of the fourth layer extend into electrical contact with the switching elements of the first layer.

The switching element may be either a top-gate type thin film transistor or a bottom-gate type thin film transistor.

The electro-optical material is preferably a liquid crystal.

The on-chip color filter structure employed in the present invention has the third layer which is interposed between the second layer having the color filters and the fourth layer having the pixel electrodes aligned with the color filters, and which has a planarization film for filling convexities presented by the switching elements and the color filters so as to present a planar surface. The color filters are therefore protected by the planarization film, and the pixel electrodes are patterned and formed on this planarization film. It is therefore possible to avoid roughening of the color filter surfaces during the film formation and patterning for forming the pixel electrodes. In addition, since the pixel electrodes are formed on the planarization film surface which is highly smooth and flat, the undesirable imperfect etching which hitherto has inevitably occurred can be avoided. Furthermore, since the pixel electrode surface also is substantially planarized, problems encountered with known arts, such as disorder of liquid crystal alignment, disclination and generation of reverse tilt domain, can be eliminated.

The second layer includes the light shielding layer in addition to the color filters, thus realizing a so-called on-chip black structure, as well as the on-chip color filter structure. Such structures contribute to realization of higher degrees of micro-fineness and aperture ratio of the pixels. When the light shielding layer is formed of a metal film, it can serve to provide electrical connection between the pixel electrodes and the switching elements, so as to improve reliability of the electrical connection therebetween.

The above and other objects, features and advantages of the present invention will become clear from the following description when the same is read in conjunction with the accompanying drawings.

BRIEF DESCRIPTION OF THE DRAWINGS

FIG. 2 is a sectional view of a critical portion of a fourth embodiment of the color display apparatus in accordance with the present invention.

DESCRIPTION OF THE PREFERRED EMBODIMENTS

Figure 1:
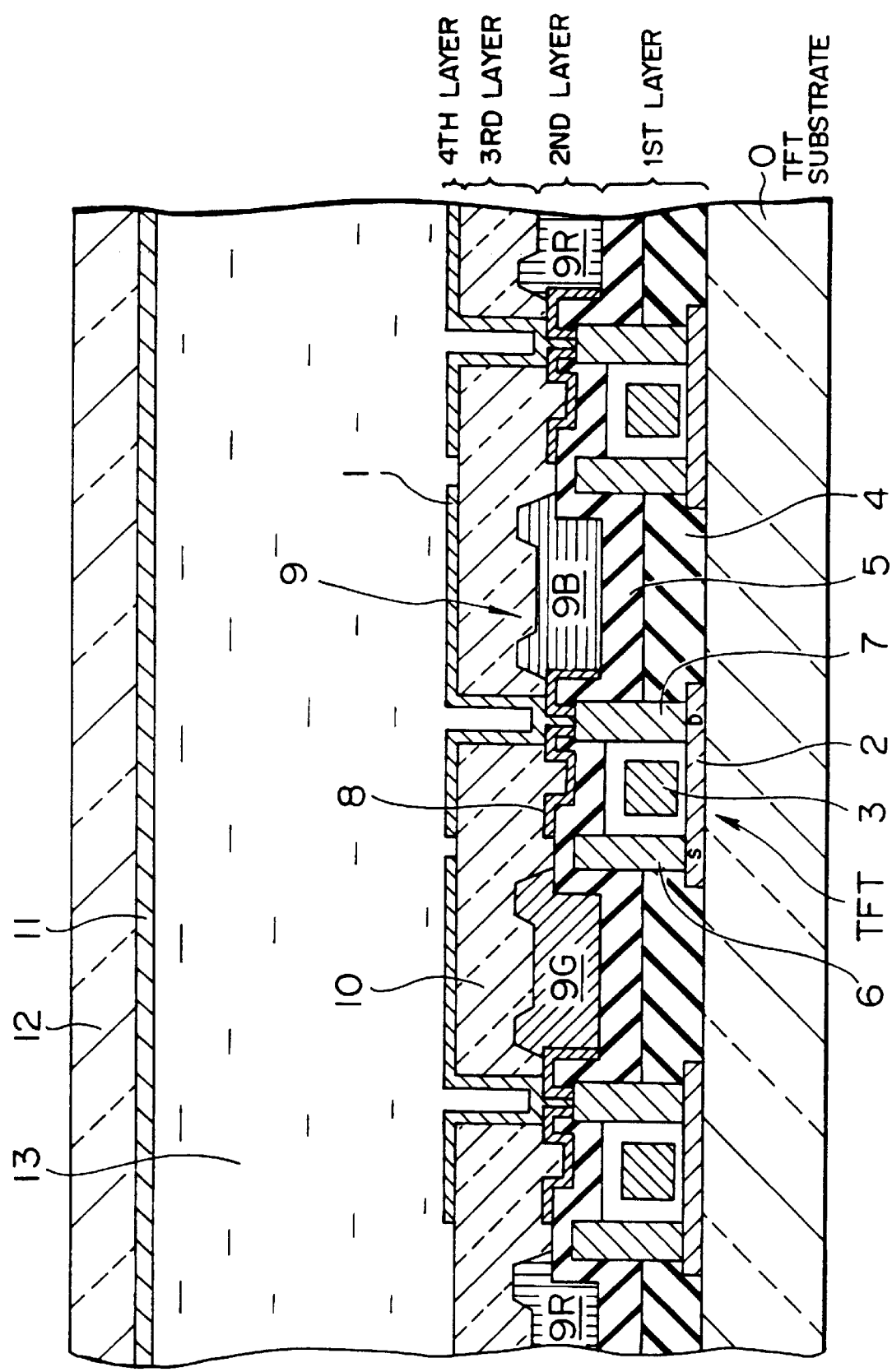
FIG. 1 is a sectional view of a critical portion of a first embodiment of the color display apparatus in accordance with the present invention.

Referring first to FIG. 1 which is a schematic sectional view of a first embodiment showing, particularly a critical portion of the color display device, the display device includes the following components or elements: a TFT substrate 0 made of an insulating material such as glass; transparent pixel electrodes 1 constituting pixels (liquid crystal cells); a semiconductor thin film 2 serving as an active layer of each TFT; a gate electrode 3 of each TFT; a first inter-layer insulating film 4; a second inter-layer insulating film 5; a wired electrode electrically connected to the source region S of each TFT and leading from a signal line; a wired electrode 7 electrically connected to the drain region D of the TFT and leading from each pixel electrode 1, a light-shielding black mask 8; a color filter 9 finely divided into segments 9R, 9G and 9B; a planarization film 10; a counter electrode 11 formed of a transparent conductive film; an opposing substrate 12; and a liquid crystal 13 used as an electro-optical substance.

More specifically, a plurality of TFTs are formed on the transparent insulating substrate 0 such as of a glass, and each TFT includes the semiconductor thin film 2 which is, for example, a polycrystalline silicon thin film, and the gate electrode 3 patterned and formed on the semiconductor thin film 2 through the intermediary of a gate insulating film. The TFT having the described construction is covered by the first inter-layer insulating film 4 such as of PSG. Wired electrodes 6, 7 are patterned and formed on the first inter-layer insulating film 4 and are connected to the source and drain regions of the semiconductor thin film 2. The electrodes 6, 7 are covered by the second inter-layer insulating film 5 which also may be formed of PSG. On the second inter-layer insulating film 5 are formed the black mask 8, color filter 9, planarization film 10 and the pixel electrode 1 formed of, for example, a transparent conductive film such as of ITO in the order or sequence mentioned above. The wired electrode 7 connected to the drain region D is electrically connected to the pixel electrode 1 through a black mask 8 made of a metal film. This metal film, which is interposed between the wired electrode 7 and the pixel electrode 1, serves as a barrier film so as to improve electrical contact therebetween. The barrier film may be a metal film of the same material as the black mask 8 but need not always be positioned so as to shield the underlying TFT. The opposing substrate 12 which is lined with the counter electrode 11 over its entire area is disposed so as to oppose to the TFT substrate 0, with the liquid crystal 13 held therebetween, thus realizing a color display device.

According to the present invention, the TFT substrate 0 has a laminate structure composed of first to fourth layers laminated in the mentioned order. More specifically, as shown in FIG. 1, the TFT substrate 0 has a first layer which is the lowermost layer including, in addition to the TFT, the wired electrodes 6, 7, first inter-layer insulating film 4 and the second inter-layer insulating film 5. A second layer includes the color filter 9. As stated before, the color filter 9 is divided into discrete segments 9R, 9G and 9B, thus presenting a surface having concavities and convexities. The second layer is overlain by a third layer which is constituted by a planarization film 10 which fills the convexities presented by the TFT and the color filter 9 so as to provide a flat smooth surface. A fourth layer which is the uppermost layer includes pixel electrodes 1 which are arranged in alignment with the segments 9R, 9G and 9B of the color filter 9. The fourth layer also includes, besides the pixel electrodes 1, an orientation film (not shown) for aligning the liquid crystal 13. The critical feature of the laminated structure resides in the provision of the third layer between the second and fourth layers. Namely, the color filter 9 and the pixel electrodes 1 are separated from each other through the planarization film 10. The planarization film 10 protects the color filter 9 against any damaging force which otherwise may be applied to the color filter 9 in subsequent steps of the process for manufacturing the color display device. The pixel electrodes 1 can be formed at a high efficiency, without impairing alignment of the liquid crystal 13, since they are patterned on the planarization film 10.

The second layer includes the black mask 8 in addition to the color filter 9, so as to shield at least the TFT from light. This arrangement provides an on-chip black structure, as well as the on-chip color filter structure, thus contributing to achievement of higher degrees of pixel fineness and aperture ratio. In this embodiment, the black mask 8 is constituted by a metal film, and the pixel electrodes 1 which belong to the fourth layer are electrically connected to the wired electrodes 7 of the TFTs of the first layer, through the metal film constituting the black mask 8. This metal film serves as a barrier film so as to realize good electrical contact between both electrodes 1 and 7. The TFT is a switching element which drives the pixel electrode 1, and has a top-gate type structure in this embodiment.

A process for producing the color display device of the present invention will be described in detail with further reference to FIG. 1. As the first step of the process, an operation is executed to form the semiconductor thin film 2, e.g., polycrystalline silicon film, of 70 to 100 nm thick on the insulating substrate 0 which is made of, for example, a glass. Then, implantation of Si+ ions is conducted as required so as to obtain an amorphous state and, thereafter, annealing is executed at a temperature of 600° C. or so, thereby obtaining greater grain size. The annealing, however, may be effected by irradiation with an excimer laser beam. This semiconductor thin film 2 is patterned into a predetermined pattern. Then, a gate insulating film of 10 to 100 nm thick is formed on the patterned semiconductor thin film 2 by thermal oxidation or LPCVD. Then, a film of polycrystalline silicon or a metal such as MoSi, WSi, Al, Ta, Mo/Ta, Mo, W, Ti, Cr or the like is formed and patterned, thus forming the gate electrodes 3. When polycrystalline silicon is used as the material of the gate electrode 3, a step may be employed for thermally diffusing, for example, P, in order to reduce the resistance. Thereafter, impurity ions are introduced by ion implantation or ion doping which is executed by using the gate electrodes 3 as masks, whereby the source and drain regions S, D are formed. When the gate structure is formed of polycrystalline silicon, thermal annealing is executed at a temperature of 1000° C. or so, thereby activating the impurities. When the gate structure is formed from a metal, activation of the impurities is achieved by a low-temperature annealing or annealing with a laser beam, in view of inferior heat resistance of the metallic gate structure.

Then, a film of PSG or NSG of about 600 nm thick is formed by CVD under normal pressure, thus forming the first inter-layer insulating film 4. Then, contact holes are formed in this film 4 so as to communicate with the source and drain regions S and D. Subsequently, a conductive thin film such as of Al is formed by, for example, sputtering to a thickness of 40 to 600 nm. This thin film is then patterned into a predetermined pattern, thus forming the wired electrodes 6 and 7. Then a film of, for example, PSG is deposited to a thickness of about 400 nm by CVD under a normal pressure, thus forming the second inter-layer insulating film 5. Subsequently, a hydrogenation step is employed to improve the performance of TFT. This hydrogenation step is carried out by, for example, exposing the TFT substrate 10 into hydrogen plasma. Alternatively, P-SiNx film is laminated followed by an annealing so as to diffuse hydrogen into the semiconductor thin film 2. After the hydrogenation step, contact holes for providing electrical connection to the pixel electrodes are formed in the second inter-layer insulating film 5. Then, a metal film having light shielding effect such as of Ti, Al, TiNx, Mo, Cr, W or silicide thereof is formed to a thickness of 50 to 1000 nm by, for example, sputtering, and the metal film thus formed is patterned to form the black mask 8.

A color resist composed of an organic photosensitive material containing a colorant such as a pigment dispersed therein is coated to a thickness of 0.5 to 3.0 μm on the black mask 8, followed by exposure, development and baking, thus forming the segments of the color filter 9. This step including the exposure, development and baking is repeated three times employing different color resists for the respective colors R, G and B, so that the aforesaid color filter segments 9R, 9G and 9B are formed in integrated state.

Then, a planarization film made of an organic transparent material is formed on the color filter 9 to a thickness of 1.0 to 3.0 μm by spin coating. An acrylic resin or a polyimide resin can suitably be used as the organic transparent material. The convexities and concavities on the TFT substrate 0 disappears as a result of formation of the planarization film, so that a substrate structure is obtained with excellent liquid crystal orientation characteristic. The planarization film also serves to prevent impurities in the color filter 9 from spreading into the liquid crystal 13. Then, contact holes are formed in the planarization film 10. Subsequently, a transparent-conductive film such as of ITO is formed to a thickness of 50 to 200 nm by, for example, sputtering, and this film is suitably patterned so that the pixel electrodes 1 are formed, whereby the laminate structure on the TFT substrate 0 is completed as shown in FIG. 1. Then, the orientation film is applied and rubbed and, thereafter, the laminate structure is adjoined to the opposing substrate 12. Finally, the liquid crystal is charged into the space under the counter electrode 11, whereby a color display device of active matrix type is obtained.

Figure 2:
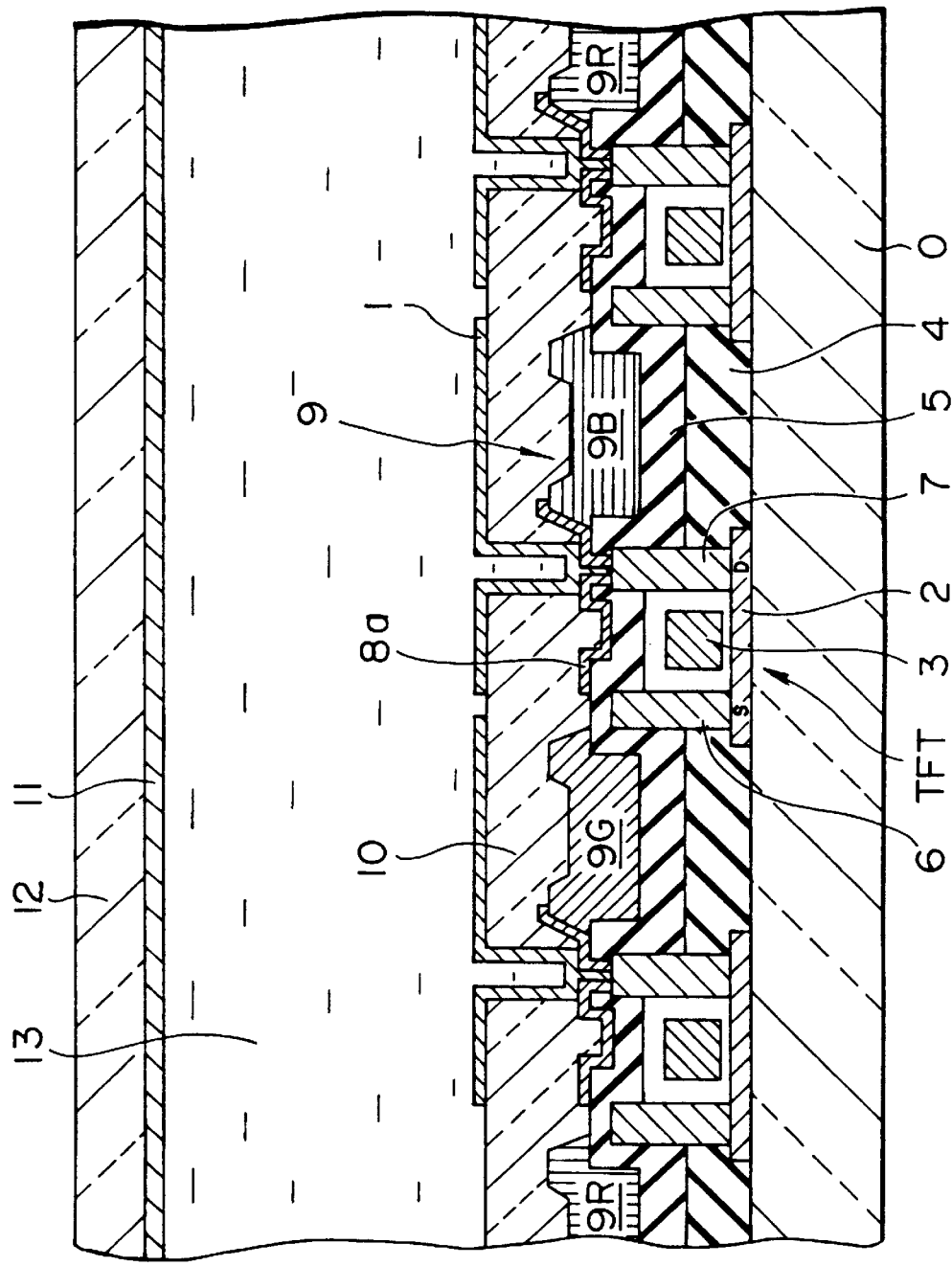
FIG. 2 is a sectional view of a critical portion of a second embodiment of the color display apparatus in accordance with the present invention.

FIG. 2 is a schematic sectional view of a portion of a color display device as a second embodiment of the present invention. This color display device has a basic structure which is the same as that of the first embodiment shown in FIG. 1. Elements or portions corresponding to those of the first embodiment are therefore denoted by the same or like reference numerals to facilitate the understanding. The second embodiment is distinguished from the first embodiment by the construction of the second layer. Namely, in the second embodiment, the color filter 9 is formed first and a black mask 8a is formed to overlie the color filter 9, which should be contrasted to the first embodiment in which the black mask 8 is formed first and then the color filter 9 is formed thereon. The structure shown in FIG. 1 or the structure shown in FIG. 2 is selected in accordance with the process design requirements.

Figure 3:
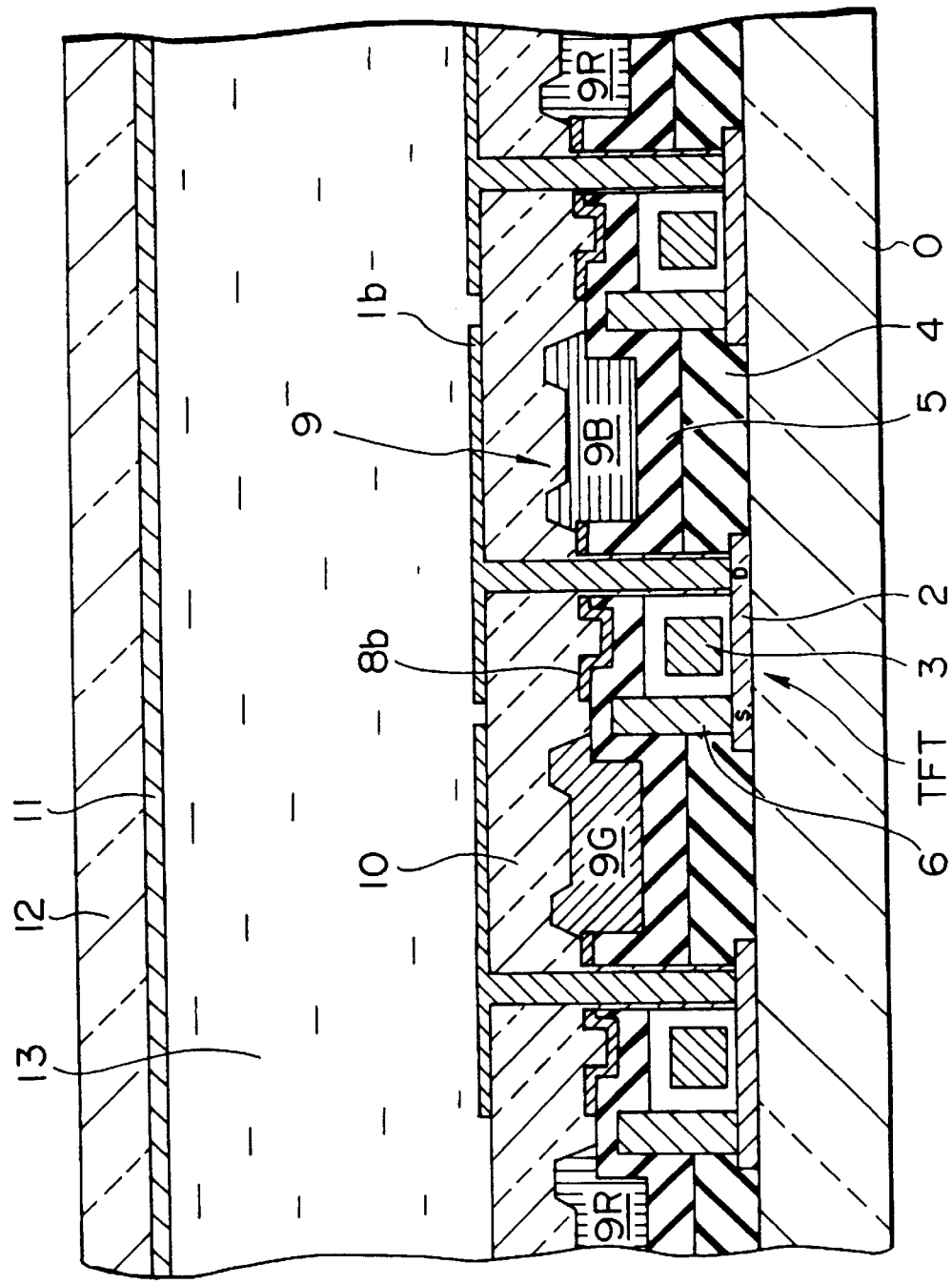
FIG. 3 is a sectional view of a critical portion of a third embodiment of the color display apparatus in accordance with the present invention.

FIG. 3 is a schematic sectional view of a portion of a color display device as a third embodiment of the present invention. This color display device has a basic structure which is the same as that of the first embodiment shown in FIG. 1. Elements or portions corresponding to those of the first embodiment are therefore denoted by the same or like reference numerals to facilitate the understanding. The third embodiment is discriminated from the first embodiment by the construction for providing electrical connection between the pixel electrode 1 and the TFT. Namely, in the third embodiment, a black mask 8b is constituted by an insulating film, and each pixel electrode 1 belonging to the fourth layer penetrates the planarization film 10 and the black mask 8b into direct electrical contact with a drain region D of the TFT which belongs to the fist layer. In this embodiment, the black mask 8b does not function as a barrier film, so that it may not be a metal film. Thus, the black mask 8b may be formed by an insulating film. For instance, the black mask 8b may be formed of a film dispersing an organic or aqueous pigment, to a thickness of 0.5 to 3.0 μm.

Figure 4:
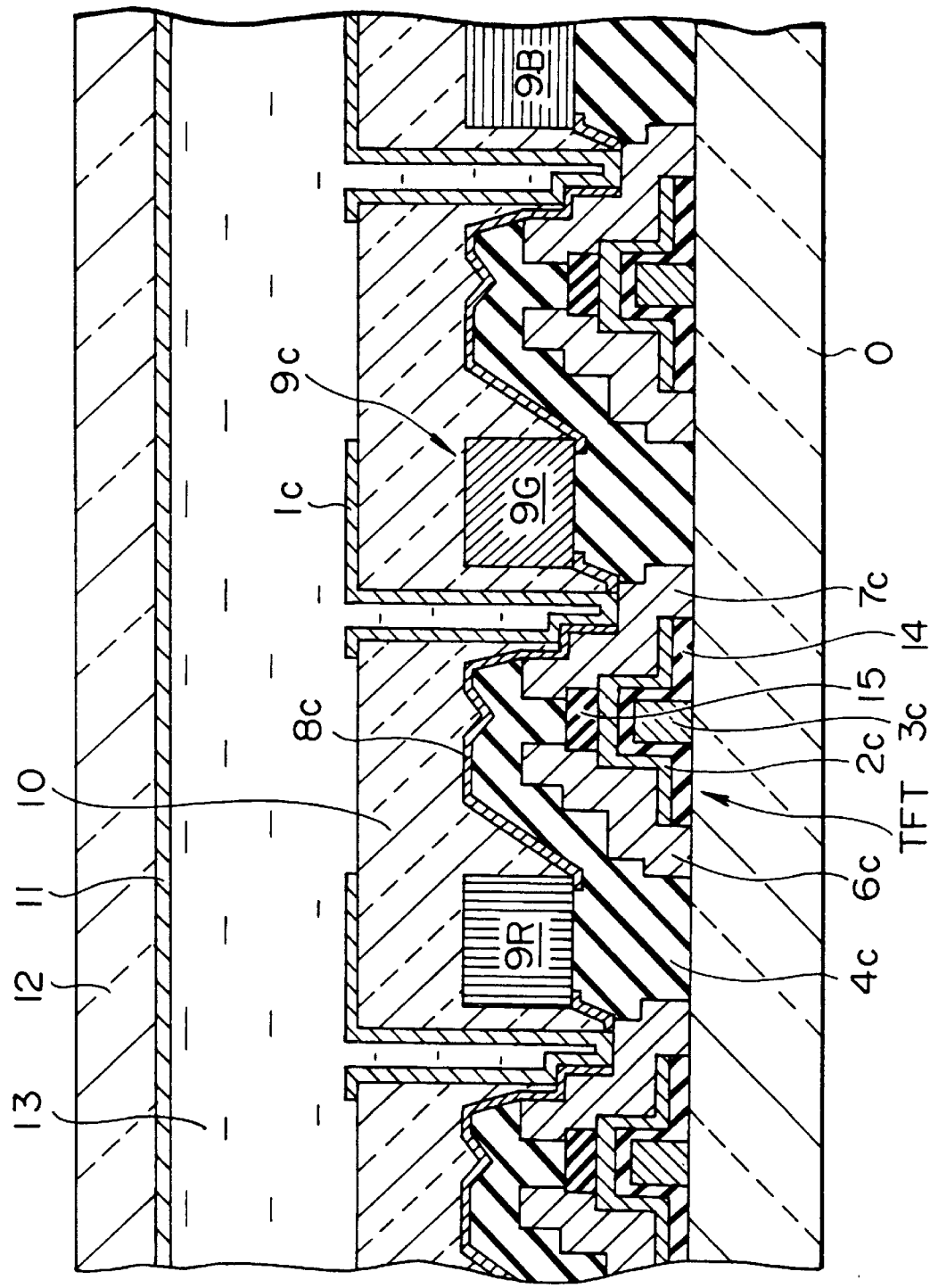
Figure 5:
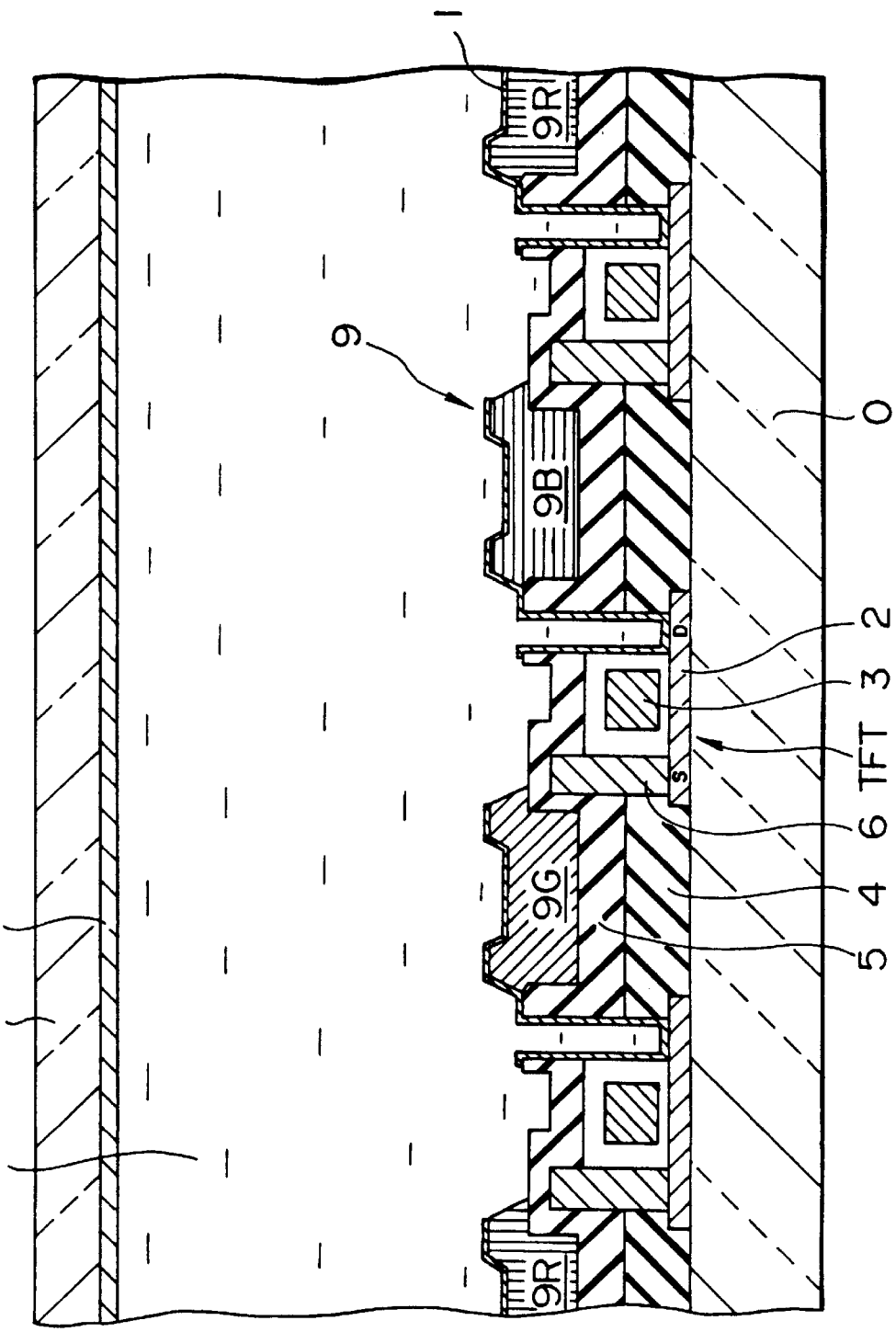
FIG. 5 is a schematic sectional view of a previously proposed color display device.

FIG. 4 is a schematic sectional view of a portion of a color display device as a fourth embodiment of the present invention. This color display device has a basic structure which is the same as that of the first embodiment shown in FIG. 1. Elements or portions corresponding to those of the first embodiment are therefore denoted by the same or like reference numerals to facilitate the understanding. In contrast to the first embodiment which employs a top-gate type TFT, the fourth embodiment uses a bottom-gate type TFT as a switching element for driving pixel electrodes. The color display device of the fourth embodiment can be fabricated in accordance with the following process. A film of polycrystalline silicon or a film of a metal such as MoSi, WSi, Al, Ta, Mo/Ta, Mo, W, Ti, Cr or the like is formed on the substrate 0 and is patterned into a predetermined pattern, thus providing gate electrodes 3c. After the formation of the gate electrodes 3c, a film of about 100 to 200 nm is formed from $SiO_2$, $SiO_xN_y$ or the like by sputtering or plasma CVD, thus forming a gate insulating film 14. If allowed by circumstance, the anode oxidation film of the metal gate electrode 3c may be used as the gate insulating film. It is also possible to form the gate insulating film from a laminate of the anode oxidation film and an overlying film such as of $SiO_2$, $SiO_xN_y$ or the like. Then, a film of polycrystalline silicon, amorphous silicon or the like is formed to a thickness of about 30 to 80 nm by sputtering or plasma CVD, thus providing a semiconductor thin film 2c as an active layer. This layer is crystallized as necessary, by irradiation with, for example, excimer laser beam. When the semiconductor thin layer 2 is formed by plasma CVD, it is possible to consecutively form the gate insulating film 14 and the semiconductor thin film 2c. After the formation of the semiconductor film 2c, an $SiO_2$ is formed and patterned into a predetermined pattern, thus forming an etching stopper 15. Ion doping or ion implantation is executed across the etching stopper 15 serving as a mask, so as to introduce impurities into the semiconductor thin film 2, thereby forming the source and drain regions. Introduction of impurity ions may be substituted by a diffusion of impurities using a doped amorphous silicon or the like prepared through a plasma CVD. Then, metal film is formed from, for example, MoSi, WSi, Al, Ta, Mo/Ta, Mo, W, Ti, Cr or the like, and this metal film is patterned into a predetermined form so as to be formed into wired electrodes 6c, 7c. Then, an inter-layer insulating film 4 is formed by, for example, CVD process under normal pressure, followed by formation of contact holes in the insulating film 4. Then, a metal film such as of Ti, Al, $TiN_x$, Mo, Cr, W or a silicide thereof is formed by, for example, sputtering to a thickness of 50 to 1000 nm, and this metal film is patterned into a predetermined pattern thus presenting a black mask 8c. A color filter 9c is then formed on the black mask 8c. The color filter may be formed by the same method as that employed in the first embodiment.

As will be seen from the foregoing description, the planarization film separates the color filter from the pixel electrodes, so as to prevent damaging of the color filter surface which otherwise may occur in the course of sputtering, thus overcoming the aforesaid problem concerning roughening of the filter surface. The planarization film also prevents impurities in the color filter from being diffused into the liquid crystal layer. Furthermore, the steps of the color filter are reduced by virtue of the presence of the planarization film, so that generation of reverse tilt domains due to presence of steps is remarkably suppressed. It is thus possible to obtain a practical on-chip color filter structure.

As will be clear to those skilled in the art, the on-chip color filter structure provides large aperture ratio at the pixel portions. In addition, mis-alignment between the pixel electrodes and the color filter is substantially eliminated. It is therefore possible to maintain high aperture ratio despite the micro-fine structure of the pixel portions. As a consequence, the present invention provides remarkable advantages of high aperture ratio and high transmittance in active matrix type color display devices.

Although the invention has been described through its preferred forms, it is to be understood that the described embodiment is only illustrative and various changed and modifications may be imparted thereto without departing from the scope of the invention which is limited solely by the appended claims.

What is claimed is:

1. A color display device, comprising:
    a first substrate having pixel electrodes arranged in the form of a matrix, thin film transistors associated with respective pixel electrodes and color filters aligned with the respective pixel electrodes, said first substrate having a laminate structure including a first layer having said thin film transistors, and an interlayer insulating layer, a second layer having said color filters and a light shielding layer provided over said thin film transistor on said insulating layer, a third layer including a planarization film for providing a planarized surface thereon, and a fourth layer having said pixel electrodes aligned with said color filters superimposed on one another in that order;
    a second substrate having a counter electrode and adjoined to said first substrate through a gap therebetween; and
    an electro-optical material held in said gap.

2. A color display device according to claim 1, wherein said planarization film is formed of an organic transparent material.

3. A color display device according to claim 1, wherein said color filters are formed of an organic photosensitive material containing pigments dispersed therein.

4. A color display device according to claim 1, wherein said light shielding layer comprises a metal film through which said pixel electrodes of said fourth layer are electrically connected to said thin film transistors of said first layer.

5. A color display device according to claim 1, wherein said light shielding layer comprises an insulating film through which said pixel electrodes of said fourth layer extend into electrical contact with said thin film transistors of said first layer.

6. A color display device according to claim 1, wherein said thin film transistor is a top-gate type thin film transistor.

7. A color display device according to claim 1, wherein said thin film transistor is a bottom-gate type thin film transistor.

8. A color display device according to claim 1, wherein said electro-optical material is a liquid crystal.

9. The display device of claim 1, wherein the light shielding layer is in contact with the drain electrode.

10. A display device comprising:
    a substrate;
    at least one active layer formed on the substrate;
    a first interlayer insulating film formed on the substrate in areas of the substrate where there is no active layer;
    a source electrode formed over a source region of the active layer;
    a drain electrode formed over a drain region of the active layer;
    a gate electrode formed over a date region of the active layer;
    a second inter-layer insulating film formed on the first interlayer insulating film and extending over the source electrode and above the gate electrode;
    a color filter formed over the second interlayer insulating film;
    a transparent-planarizing layer formed over the color filter;
    a pixel electrode formed over the planarizing layer; and
    further comprising a single mask layer formed over the second interlayer insulating film above the gate electrode beneath the planarizing layer extending from a location at least adjacent to the drain electrode.

11. The display device of claim 10, wherein the mask layer is formed beneath a portion of the color filter.

12. The display device of claim 10, wherein the mask layer is formed above a portion of the color filter.

13. The display device of claim 10, wherein the mask layer is conductive and connects the pixel electrode with the drain electrode.

14. The display device of claim 13, wherein the mask layer is formed beneath a portion of the color filter.

15. The display device of claim 13, wherein the mask layer is formed above a portion of the color filter.

16. The display device of claim 10, wherein the drain electrode extends to the top surface of the planarizing layer and connects directly with the pixel electrode.

17. The display device of claim 10, wherein the mask layer is in contact with the drain electrode.

18. A display device comprising:

a substrate;

at least one gate electrode formed on the substrate;

a gate insulating film formed over the gate electrode;

an active layer formed over the gate insulating film;

an etching stopper formed on the active layer over the gate electrode;

a source electrode connected to a source region of the active layer;

a drain electrode connected to a drain region of the active layer;

an interlayer-insulating film formed over the source electrode and etching stopper;

a mask layer formed on the interlayer-insulating film in a region above the active layer;

a color filter formed on the interlayer-insulating film in a region which is not above the active layer;

a planarizing layer formed on the color filter and mask layer; and a pixel electrode formed on the planarizing layer.

19. A color display device comprising:

a substrate;

at least one thin film transistor having a semiconductor layer formed on the substrate;

an interlayer insulating layer formed over the thin film transistor;

a color filter formed on the interlayer insulating layer;

a light shielding layer formed on the interlayer insulating layer;

a transparent-planarizing layer formed on the color filter and light shielding layer for providing a planarized surface thereon; and a pixel electrode formed on the planarizing layer.

20. A color display device of claim 19, wherein said pixel electrode is connected to the semiconductor layer.

21. A color display of claim 19, further comprising a drain electrode, and wherein said pixel electrode is connected to the semiconductor layer through the drain electrode.

22. A color display of claim 19, wherein said light shielding layer is a metal, and said pixel electrode is connected to the semiconductor layer through the light shielding layer.

23. A color display of claim 20, further comprising a drain electrode, and wherein said pixel electrode is connected to the semiconductor layer through the drain electrode.

24. A color display of claim 23, wherein said light shielding layer is a metal, and said pixel electrode is connected to the semiconductor layer through the light shielding layer.

25. A color display device, comprising:

a substrate;

at least one thin film transistor having a gate electrode formed on the substrate;

an interlayer insulating layer formed over the thin film transistor;

a color filter formed on the interlayer insulating layer;

a light shielding layer formed on the interlayer insulating layer;

a transparent-planarizing layer formed on the color filter and light-shielding layer for providing a planarized surface thereon; and a pixel electrode formed on the planarizing layer.

* * * * *